United States Patent Office 2,988,455
Patented June 13, 1961

2,988,455
POLYSACCHARIDE COMPOSITION AND METHOD OF MANUFACTURE
Sheldon Rosenberg, Westport, Conn., and David Bandel, Chestnut Hill, Mass., assignors to American Machine & Foundry Company, a corporation of New Jersey
No Drawing. Filed Mar. 6, 1958, Ser. No. 719,489
19 Claims. (Cl. 106—169)

This invention relates to water-resistant cross-linked polysaccharide compositions. More particularly, the invention relates to polysaccharide film-forming gums which are cross-linked in combination with dialdehyde polysaccharide polymers.

Polysaccharide film-forming gums are widely used as thickening agents, adhesives and coatings. It has been known for a long time that the wet strength of dried films of these gums can be augmented by the combination therewith of small amounts of glyoxal or of pyruvic aldehyde in larger amounts. These materials do not always provide adequate cross-linking of the gums. Moreover, it is difficult to obtain these simple synthetic dialdehyde materials free from impurities.

Periodate oxidized dialdehyde polysaccharides have been known for many years and can be easily made in a relatively high state of purity. Moreover, some of these materials have slight inherent film-forming properties themselves. Therefore, it is an object of this invention to provide a novel polysaccharide composition of matter wherein polysaccharide gum-forming gums are cross-linked by dialdehyde polysaccharides.

Another object of the invention is to provide a method of cross-linking polysaccharide gums.

Another object of the invention is to provide water-resistant polysaccharide compositions.

Acording to this invention dialdehyde or periodate oxidized (oxy-) polysaccharides are mixed with polysaccharide gums in a liquid (preferably water) and dried to form a cross-linked polymer material.

Among suitable dialdehyde polysaccharides are dialdehyde forms of starch, cellulose, dextran and galactomannans such as locust bean gum. A water-resistant polysaccharide composition of matter may be made by mixing a dialdehyde polysaccharide in water with a polysaccharide gum to form a paste or slurry which is dried to form a waterproof material. The wet material may be shaped prior to drying into a film or coating for example. Moreover, various fillers may be mixed with the polysaccharide such as color or flavor agents, food, tobacco, insecticides or antiseptics. The water-resistant polysaccharide composition, therefore, acts as a vehicle or matrix.

Among suitable polysaccharide gums are cellulose ethers such as methyl cellulose, carboxymethyl cellulose (particularly the alkali metal salts thereof), hydroxyethyl cellulose, hydroxyethyl carboxymethyl cellulose, ethyl cellulose, methyl ethyl cellulose and hydroxypropylmethylcellulose. Other suitable polysaccharides which may be cross-linked and insolubilized by dialdehyde polysaccharides are film-forming starches such as amylose, polyuronides such as pectins and algins and their derivatives, galactomannans such as guar and locust bean gum, carageenans, karaya and tragacanth. These materials may be used separately or in mixtures. The adhesive polysaccharide is prepared by dispersing up to five percent by weight of a suitable polysaccharide gum in a liquid, which ordinarily includes some water, but may also be an organic solvent, in some cases of highly substituted polysaccharides, for example.

The dialdehyde polysaccharide cross-linking agent is prepared by rapid agitation of two to twenty percent by weight of dialdehyde polysaccharide powder in boiling water or in water having a temperature between 90 degrees C. and 100 degrees C. This is cooled and mixed with the adhesive preparation so that the dialdehyde is five to one hundred percent (or one-twentieth of a part to one part) by weight based on the polysaccharide film former. A solution of dialdehyde polysaccharide may also be prepared in cold aqueous sodium phosphate at a pH below 8.5 in a two to three percent phosphate solution. One or two percent sodium bicarbonate works similarly.

Various dialdehyde or oxy type polysaccharide materials are suitable for cross-linking polysaccharide film-forming gums. These are prepared by the oxidation of polysaccharides with periodic acid, for example, according to well-known reactions. The more completely oxidized materials are preferred, although almost any degree of oxidation is useful.

Among the polysaccharides which form useful oxy derivatives of dialdehyde forms with periodic acid for cross-linking of polysaccharide gums are cellulose, starch, dextran and galactomannans such as locust bean gum.

Various plasticizers can usefully be included in these polysaccharide compositions. These include glycerine, sorbitol and the glycols such as tetraethylene glycol, for example.

A feature of the invention is that methyl cellulose, which does not readily form a water-resistant polymer with glyoxal, can be used to form water-resistant films and coatings with a dialdehyde polysaccharide such as starch. Oxystarch has inherent film-forming properties and when combined with polysaccharide adhesive film-forming gums gives a somewhat tougher sheet, both wet and dry, than glyoxal. When used for human or animal consumption an advantage of the use of oxy polysaccharides (dialdehyde polysaccharides) is found in their direct derivation from natural vegetable products. A further advantage is found in the easy separation of films made with oxypolysaccharides from film-forming surfaces.

The invention is further illustrated by the following examples in which the dialdehyde materials were substantially completely oxidized.

*Example 1*

In a preferred example of the manufacture of polysaccharide compositions according to this invention five pounds of sodium carboxymethyl cellulose, which forms a two percent by weight aqueous solution characterized by a viscosity between 250 and 1,000 centipoises at 20° C. as measured on a Brookfield Viscosimeter, were dispersed in 145 pounds of water.

To this solution were added fifty pounds of a five percent solution of completely periodate oxidized starch in water and the composite solution was mixed. Two and one-half pounds of glycerine were mixed in to act as a plasticizer. This complex viscous coating material was applied upon a stainless steel surface and dried to form a tough water-resistant film.

*Example 2*

In the manufacture of polysaccharide material according to this invention, five pounds of methyl cellulose, which forms a two percent aqueous solution by weight characterized by a viscosity of about 4,000 centipoises at 20° C. as measured on a Brookfield Viscosimeter, and two and one-half pounds of triethylene glycol were added to 145 pounds of water.

To this solution were added forty pounds of a ten percent solution of completely periodate oxidized locust bean gum (dialdehyde carob gum) in water and the composite solution was mixed. The mixture was applied to a stainless steel surface and dried into a water-resistant film.

*Example 3*

In another example of the manufacture of polysaccharide film according to this invention, four pounds of 200 mesh locust bean gum, which forms a two percent by weight aqueous solution characterized by a viscosity between 800 and 2,500 centipoises at 20° C. as measured on a Brookfield Viscosimeter, were dispersed in one hundred pounds of water with about three pounds of sorbitol.

To this solution were added nineteen ounces of oxydextran (dialdehyde dextran) and the composite solution was mixed and applied upon a film-forming surface where it was dried and removed as a film.

*Example 4*

In a further example of the manufacture of polysaccharides according to this invention, a dry blend of powders consisting of two pounds of locust bean gum, two pounds of sodium carboxymethyl cellulose and one pound of methyl cellulose was dispersed in 150 pounds of water.

To the solution were added fifty pounds of a five percent solution of completely periodate oxidized starch (dialdehyde starch) in water and the composite solution was mixed. This was applied upon an endless, stainless steel film-forming belt surface where it was dried and removed in a continuous sheet.

There has thus been described a novel polysaccharide composition made by cross-linking film-forming polysaccharide gums with dialdehyde polysaccharides to form films, coatings and innocuous vehicles for fillers such as food and tobacco. These polysaccharide materials are characterized by substantial wet strength and water-resistance.

What is claimed is:

1. A method of making a polysaccharide composition of matter comprising in combination the steps of dissolving a dialdehyde polysaccharide selected from at least one of the group consisting of starches, cellulose, galactomannans and dextrans in a buffered aqueous salt solution to form a cross-linking solution, dissolving a polysaccharide in water to form a polysaccharide solution, mixing said cross-linking solution with said polysaccharide solution to form a mixed solution and drying said mixed solution to form a polysaccharide composition of matter.

2. A method of making a polysaccharide composition of matter comprising in combination the steps of dissolving and agitating a dialdehyde polysaccharide selected from at least one of the group consisting of starches, cellulose, galactomannans and dextrans in water between 90° and 100° C. to form a cross-linking solution, forming an aqueous polysaccharide preparation from a water soluble polysaccharide, mixing said preparation and said cross-linking solution to form a mixed preparation and drying said mixed preparation to form a polysaccharide composition of matter.

3. A composition of matter consisting essentially of one part by weight of a "water soluble" polysaccharide film-forming material selected from at least one of the group consisting of cellulose ethers, starches, polyuronides, galactomannans, carrageenans, karaya and tragacanth in combination with from one-twentieth part to one part by weight of a dialdehyde polysaccharide selected from at least one of the group consisting of starches, cellulose, galactomannans and dextrans.

4. A composition of matter consisting essentially of one part by weight of a "water soluble" cellulose ether film-forming material in combination with from one-twentieth part to one part by weight of a dialdehyde polysaccharide selected from at least one of the group consisting of starches, cellulose, galactomannans and dextrans.

5. A composition of matter consisting essentially of one part by weight of a "water soluble" cellulose ether film-forming material in combination with from one-twentieth part to one part by weight of a dialdehyde starch.

6. A composition of matter consisting essentially of one part by weight of a film-forming starch in combination with from one-twentieth part to one part by weight of a dialdehyde polysaccharide selected from at least one of the group consisting of starches, cellulose, galactomannans and dextrans.

7. A composition of matter consisting essentially of one part by weight of a polyuronide film-forming material in combination with from one-twentieth part to one part by weight of a dialdehyde polysaccharide selected from at least one of the group consisting of starches, cellulose, galactomannans and dextrans.

8. A composition of matter consisting essentially of one part by weight of a polyuronide film-forming material in combination with from one-twentieth part to one part by weight of a dialdehyde starch.

9. A composition of matter consisting essentially of one part by weight of a galactomannan film-forming material in combination with from one-twentieth part to one part by weight of a dialdehyde polysaccharide selected from at least one of the group consisting of starches, cellulose, galactomannans and dextrans.

10. A composition of matter consisting essentially of one part by weight of a galactomannan film-forming material in combination with from one-twentieth part to one part by weight of a dialdehyde starch.

11. A composition of matter consisting essentially of one part by weight of a carrageenan film-forming material in combination with from one-twentieth part to one part by weight of polysaccharide selected from at least one of the group consisting of starches, cellulose, galactomannans and dextrans.

12. A composition of matter consisting essentially of one part by weight of a carrageenan film-forming material in combination with from one-twentieth part to one part by weight of a dialdehyde starch.

13. A composition of matter consisting essentially of one part by weight of a tragacanth film-forming material in combination with from one-twentieth part to one part by weight of a dialdehyde polysaccharide selected from at least one of the group consisting of starches, cellulose, galactomannans and dextrans.

14. A composition of matter consisting essentially of one part by weight of a film of gum tragacanth in combination with from one-twentieth part to one part by weight of a dialdehyde starch.

15. A composition of matter consisting essentially of one part by weight of a "water soluble" polysaccharide film-forming material selected from at least one of the group consisting of cellulose ethers, starches, polyuronides, galactomannans, carrageenans, karaya and tragacanth in combination with from one-twentieth part to one part by weight of a dialdehyde starch.

16. A composition of matter consisting essentially of one part by weight of a polysaccharide film-forming material selected from at least one of the group consisting of cellulose ethers, starches, polyuronides, galactomannans, carrageenans, karaya and tragacanth in combination with from one-twentieth part to one part by weight of a dialdehyde galactomannan.

17. A composition of matter consisting essentially of one part by weight of a polysaccharide film-forming material selected from at least one of the group consisting of cellulose ethers, starches, polyuronides, galactomannans, carrageenans, karaya and tragacanth in combination with from one-twentieth part to one part by weight of a dialdehyde dextran.

18. A composition of matter consisting essentially of one part by weight of methyl cellulose in combination with at least one dialdehyde polysaccharide selected from the group consisting of starches, cellulose, galactomannans and dextrans.

19. A composition of matter consisting essentially of one part by weight of a polysaccharide film-forming material selected from at least one of the group consisting of cellulose ethers, starches, polyuronides, galactomannans, carrageenans, karaya and tragacanth in combination with tetraethylene glycol and from one-twentieth part to one part by weight of a dialdehyde polysaccharide selected from at least one of the group consisting of starches, cellulose galactomannans and dextrans.

References Cited in the file of this patent

UNITED STATES PATENTS

| | | |
|---|---|---|
| 2,267,277 | Houk et al. | Dec. 23, 1941 |
| 2,602,082 | Owen | July 1, 1952 |
| 2,648,629 | Dvonch et al. | Aug. 11, 1953 |
| 2,803,558 | Fronmuller | Aug. 20, 1957 |
| 2,879,268 | Jullander | Mar. 24, 1959 |

OTHER REFERENCES

Radley: Manufacturing Chemist and Manufacturing Perfumer, July 1942, XIII, 7, page 158.